United States Patent [19]

Brownawell

[11] Patent Number: 5,056,547
[45] Date of Patent: Oct. 15, 1991

[54] RELATIVE HUMIDITY GENERATION TECHNIQUE

[75] Inventor: Mark E. Brownawell, Wellesley, Mass.

[73] Assignee: High Voltage Engineering Corporation, Burlington, Mass.

[21] Appl. No.: 545,093

[22] Filed: Jun. 27, 1990

Related U.S. Application Data

[63] Continuation of Ser. No. 295,125, Jan. 9, 1989, abandoned.

[51] Int. Cl.⁵ ............................................. E03B 1/00
[52] U.S. Cl. ................................. 137/3; 137/624.15; 236/44 R
[58] Field of Search ............................ 236/44 A, 44 R; 137/603, 624.15, 607, 3

[56] References Cited

U.S. PATENT DOCUMENTS

| | | | |
|---|---|---|---|
| 1,819,643 | 8/1931 | Fleisher | 236/44 R |
| 2,104,851 | 1/1938 | Crawford | 236/44 R |
| 2,754,063 | 7/1956 | Kersten | 236/44 A |
| 3,532,270 | 10/1970 | Schoen, Jr. | 236/44 R |
| 4,018,685 | 4/1977 | Saunders et al. | 137/624.15 |
| 4,019,523 | 4/1977 | Clark et al. | 137/607 X |
| 4,392,514 | 7/1983 | Farley et al. | 137/607 X |

Primary Examiner—William E. Wayner
Attorney, Agent, or Firm—Robert F. O'Connell

[57] ABSTRACT

A humidity generating method and apparatus which utilizes a source of air which can be supplied to a saturator and to a drier for supplying wet and dry air streams. Control means are provided to control a cyclical supplying of alternating timed quantities of wet and dry air streams to a chamber to provide a mixed air stream having a desired relative humidity.

11 Claims, 2 Drawing Sheets

RELATIVE HUMIDITY GENERATION TECHNIQUE

This is a continuation of copending application Ser. No. 07/295,125 filed on Jan. 9, 1989 now abandoned.

INTRODUCTION

This invention relates generally to relative humidity generation techniques and, more particularly, to a unique relative humidity generator which utilizes time domain control.

BACKGROUND OF THE INVENTION

The techniques currently used for relative humidity generation conventionally operate under flow rate control wherein a humidity generator continually mixes together a continuous stream of dry air and a continuous stream of saturated, or wet, air, in a selected proportion controlled in accordance with the flow rates thereof, into a mixing chamber or nozzle to generate an output air stream having a desired relative humidity. The dry air stream has a vapor pressure (of water) ($V_p$) substantially equal to zero while the wet stream has a vapor pressure substantially equal to the vapor pressure at saturation ($V_{psat}$). The two streams which are mixed in the mixing chamber produce a mixed air stream having a vapor pressure somewhere between zero and $V_{psat}$ depending on the ratio of the amounts mixed as controlled by the flow rates thereof into the mixing chamber If the mixture is kept at the saturation temperature of $V_{psat}$, the percent relatively humidity (% RH) of the mixture can be determined in accordance with the following equation:

$$\%RH = \frac{fd \times V_p(\text{dry}) + fw \times V_p(\text{sat})}{(fd + fw) \times V_p(\text{sat})} \times 100$$

where fd is the flow rate of dry air and fw is the flow rate of wet air. If the vapor pressure of dry air is zero, then equation two can be rewritten as:

$$\%RH = \frac{fw}{(fd + fw)} \times 100$$

if the dry air stream is totally dry (0% RH) and if the wet air stream is completely saturated (100% RH) and if no water vapor is added or removed from the streams after the flows are metered and the temperature and pressure of the generated % RH is the same as the temperature and the pressure of saturation of the wet air stream.

Systems which have used such continuous mixing of selected proportions of wet and dry air have normally required precise measurement and control of the flow rates of the selected proportions of wet and dry air which must be performed using relatively expensive flow sensors or metering devices. Such humidity generating apparatus have generally been extremely large and bulky, as well as relatively costly and somewhat difficult to use.

It is desirable to be able to generate an air stream for supplying to a test chamber to create a desired % RH of the air in the test chamber at a much lower cost while achieving accuracy equivalent at least to that achieved by currently available humidity generators. Moreover, it is desirable to be able to make such devices in a relatively compact manner so that they are not only less bulky in terms of their spatial characteristics but also more light in weight so that they can be made portable so as to be readily carried by a user from one location to another.

BRIEF SUMMARY OF THE INVENTION

In accordance with the invention a relatively low cost device which is capable of being fabricated as a portable humidity generator taking up significantly less space and weighing considerably less than currently available humidity generators has been devised using a time domain control technique.

In accordance with a preferred embodiment thereof, an air stream, at room temperature and humidity, for example, is arranged so that it can be supplied at a substantially constant flow rate to a saturator for producing a wet (i.e., saturated or essentially 100% RH) air stream or to a drier for producing a substantially dry (0% RH) air stream. The diversion of the incoming air stream to the saturator or to the drier is controlled so that the output air stream from the saturator is supplied to a mixing chamber over a first portion of a supply cycle, while the output air stream from the drier is supplied to the mixing chamber over a second, or remaining, portion of a supply cycle. The frequency of the overall supply cycle is appropriately selected for alternately supplying the wet and dry air stream at a selected cyclic rate. By modulating the time during which the wet air is supplied to the mixing chamber and the time during which the dry air is supplied thereto in each cycle, the air in the mixing chamber can be suitably and smoothly blended to provide air therein having a desired % RH and then supplied to a test chamber for use. In effect, the wet and dry air are supplied as pulsed air streams to the mixing chamber while the output air stream therefrom can be supplied in a substantially continuous manner to the test chamber.

Appropriate techniques are further devised for calibrating the system so as to provide the most effective operation with a minimization of potential errors which may occur due to the fact that the wet air may not be completely saturated and due to the fact that the relationship between the RH desired to the wet air modulation time may in some embodiments be non-linear.

DESCRIPTION OF THE INVENTION

The invention can be described in more detail with the help of the accompanying drawings wherein FIG. 1 shows a block diagram of one preferred embodiment in accordance with the invention;

Figure 1:
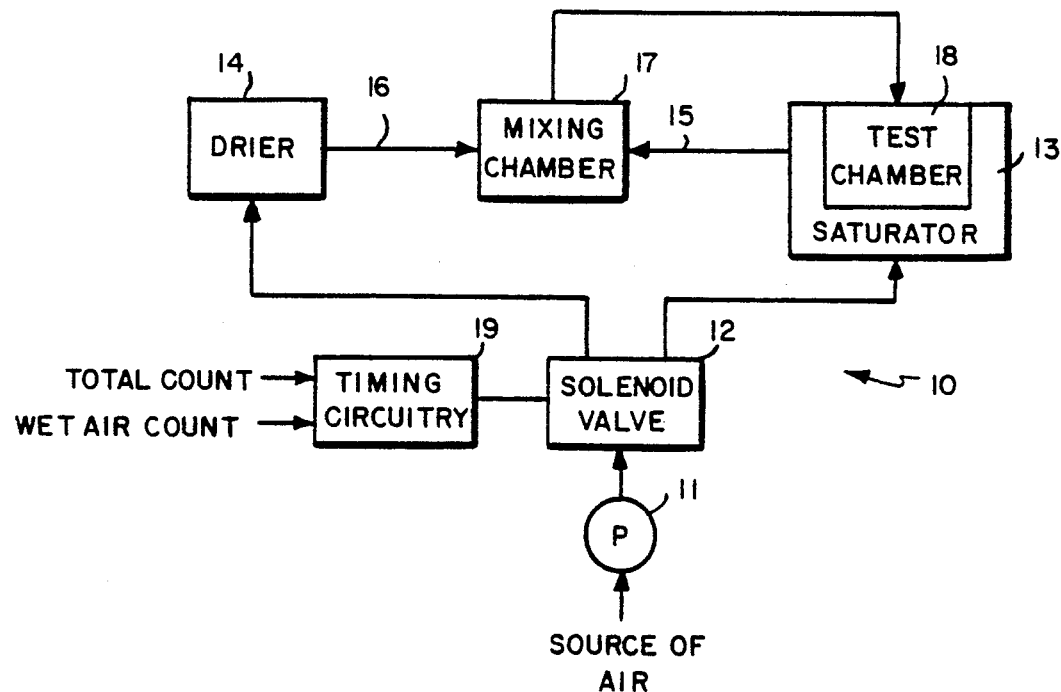

As can be seen in FIG. 1, air from a suitable source thereof is supplied via pump 11 to a solenoid valve 12. The air which is so supplied may be obtained, for example, as room air so that the input air stream from pump 11 is at room temperature and room humidity.

The solenoid valve then can supply such input air stream either to a saturator 13 or to a drier 14 which supply, respectively, substantially completely saturated air (100% RH) at output line 15 from the saturator 13 or substantially dry air (0% RH) at line 16 from drier 14.

The saturated air at line 15 and the dry air at line 16 are supplied to a mixing chamber 17 for appropriate mixing therein, the output of the mixing chamber being thereupon supplied substantially continuously for use to a test chamber 18.

The saturated and dry air streams are supplied to the mixing chamber alternately during each supply cycle. The frequency of the supply cycles can be appropriately selected, as discussed below, the supplying of the pulses of saturated and dry air streams into the mixing chamber being at a rate determined by such frequency The relative times during each cycle that the saturated and dry air streams are supplied, respectively, to the mixing chamber is controlled by use of suitable timing circuitry 19, as explained in more detail below.

Figure 2:
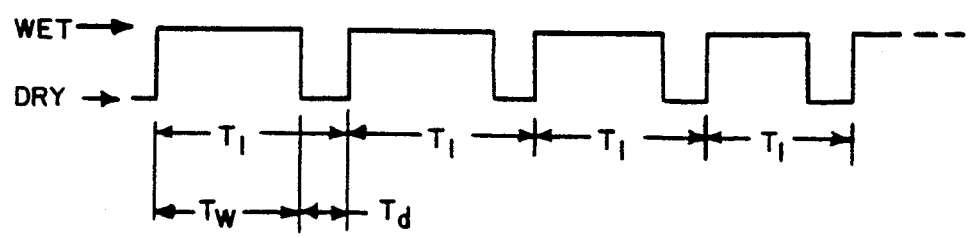
FIG. 2 shows a timing diagram depicting the relative times the wet and dry air streams are supplied during a number of exemplary supply cycles.

FIG. 2 illustrates a few exemplary supply cycles to show the relationship of the relative portions of each cycle which are used for supplying wet air and dry air streams, respectively. As can be seen therein, each cycle has a constant time period, dependent upon the frequency thereof, indicated as $T_1$, while the portion thereof during which wet air is supplied is designated as $T_w$ and the portion during which dry air is supplied is designated as $T_d$. The times selected for supplying the wet and dry air streams can be varied to provide an appropriate apportioning of the wet and dry air streams so as to produce a desired relative humidity of the output air stream from the mixing chamber.

The timing circuit operates to control the solenoid valve by utilizing appropriate counting circuits which are well known in the art. The user selects a total count which represents the time period of the overall cycle involved (i.e., the total count determines the time period $T_1$). The user further selects a number of counts for supplying the wet air, which count determines the time period $T_w$. The remainder of the time during the total count then represents the time for supplying the dry air ($T_d$).

Accordingly, in order to provide a mixing of wet and dry air to produce a desired relative humidity the user selects the total number of counts representing the time period for a desired supply cycle while the wet air count determines the portion of such time period for supplying wet air to the time for supplying dry air as a part of such overall time period.

An example of such technique can be discussed in connection with the graphs of FIGS. 3A and 3B, in each of which the relationship between the % RH of an output air stream to the wet air count is depicted. As can be seen in FIG. 2, if a supply cycle time period $T_1$ is one second, wet air is supplied over a first portion $T_w$ of the one second time period and dry air is supplied over the remaining portion Td thereof. If a resolution for the % RH of 0.1% is desired, for example, a 1000 Hz clock is utilized, each one second time period requiring 1000 clock output counts. If wet air (completely saturated air) is supplied throughout the entire cycle count, i.e., wet air is supplied for a full 1000 counts ($T_w$=1000), then the output air stream from the mixing chamber is at a fully saturated condition, i.e , it has 100% RH as shown at point A of the graph of FIG. 3A. If the wet air count is zero, i.e., dry air is supplied to the mixing chamber over the full 1000 counts ($T_w$=0 ), then the output air stream from the mixing chamber is fully dry, i.e., it has a 0% RH, as shown at point B of FIG. 3A. If the wet air stream humidity is a true 100% RH at all times and the dry air humidity is a true 0% RH at all times and no other errors occur in the system then the relationship between the wet air count to the output % RH would be essentially linear, as shown by straight line 20.

However, errors can occur in this system because of errors arising in the % RH of the dried and saturated air streams, errors arising because of control valve response time, which inserts delay times, and errors arising because of total flow considerations, in that the total flow out of the drier is less than the flow into the drier by the amount of any water vapor removed therein and in that the total flow out of the saturator is greater than the flow into it by the amount of any water vapor added therein.

Figure 3A:
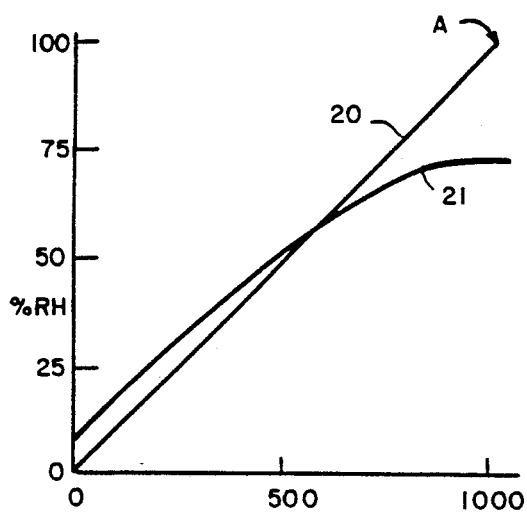
FIGS. 3A and 3B show graphs of curves helpful in understanding the operation and calibration of a system in accordance with the invention.
Figure 3B:
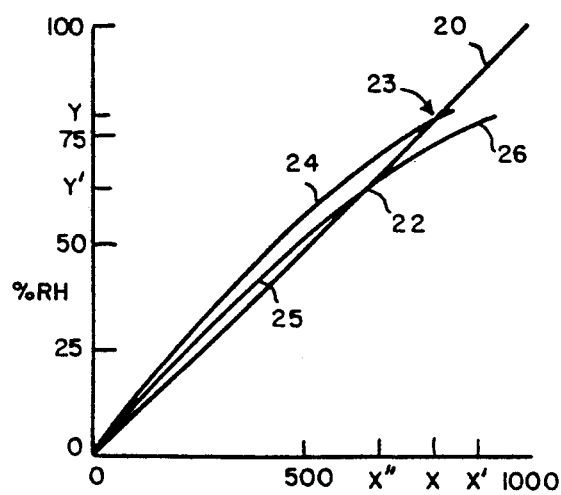

Such errors cause the actual curve of output % RH as a function of wet air count to follow a nonlinear relationship, as shown in FIG. 3A by exemplary curve 21 (relatively highly exaggerated for clarity). In general the deviations at the lower and higher ends are due to errors in the % RH of the dried and saturated air stream from precise 0% RH and 100% RH values, respectively. Flattening of the curve at the high end is generally due to the insertion of time delays by the control valve response time. The non-linear curvature of the overall curve 21 is generally due to the removal or addition of water vapor in the drier and saturator, respectively. In practice commercially available driers can usually dry to a fraction of 1% RH, in which case the resultant curve generally passes relatively close to the origin at the low end, and in general the curvature thereof is normally less than 1% RH.

It is possible to make the operating curve match the linear curve more closely by the simple expedient of reducing the total cycle counts until the total cycle counts equal the % RH generated by the saturator, wherein, at that count, the wet air stream will be on full time, providing such % RH at that count. Thus, as shown in FIG. 3B by curve 24, the total cycle counts are reduced to X counts to produce a saturated % RH at Y as shown at point 23. Wet counts greater than the total cycle time will be ignored because the cycle is reset at the lower cycle count X.

Slightly better accuracies can be obtained by increasing the total cycle count to X', for example, as shown by curve 25 at point 26, and then calibrating the device against a known standard at a lower % RH (e.g. at Y' corresponding to a wet count at X") than the saturated output % RH at Y, as shown at calibration point 22 in curve 25.

In a more likely practical situation, for example, if the maximum saturation that can be achieved is 98.9% RH (as opposed to a full 100% RH), calibration of the system shown in FIG. 1 is relatively easy to perform as follows. The total count is set for 989 counts (equivalent to point 26 of curve 25, for example), rather than 1000 counts, since maximum saturation will be reached at 98.9% RH rather than at 100%. The wet count is then set at 800 counts so as to provide an 80% RH, i.e., 800 counts of wet air mixed with 189 counts of dry air produces an 80% RH when the wet air is at 98.9% RH (equivalent to calibration point 22 of curve 25, for example) By so setting the wet count, an output curve (equivalent to curve 25) provides a relatively close match to a linear curve 20 over a major portion thereof up to about 80% RH, or slightly higher, but becomes more mis-matched at the high end of the curve. In effect, the total count is adjusted to ensure an output of 80% at 800 counts wet. Accordingly, if a desired % RH for the test chamber is expected to lie below about 80% RH, a relatively good match can be achieved even though the output curve may be too non-linear at points beyond that range. It has been found in a practical system, for example, that setting the wet air count at 800 counts for 80% RH provides relatively small deviations from the linear curve over the range from 20% RH to 80% RH, e.g., such a curve provides a % RH of 50.2% at 500 counts (as compared to 50%) and a % RH of 20.1% at 200 counts (as compared to 20%). The non-linear portion of the curve at the upper end will not achieve a % RH above 98.9% and at 999 counts, for example, the relative humidity of the output air stream is still found to be 98.9%.

If the expected range of the desired % RH is going to extend over a different range, it might be desirable to match the output curve to curve 20 at some other calibration point depending on such expected range. The selection can be made by the user as desired and calibration only requires the setting of the total count (in terms of the highest % RH that can be achieved in the wet air stream) and then selecting a wet air count as desired to achieve a desired range of % RH to match as effectively as possible a linear curve over the range of interest.

Figure 4:
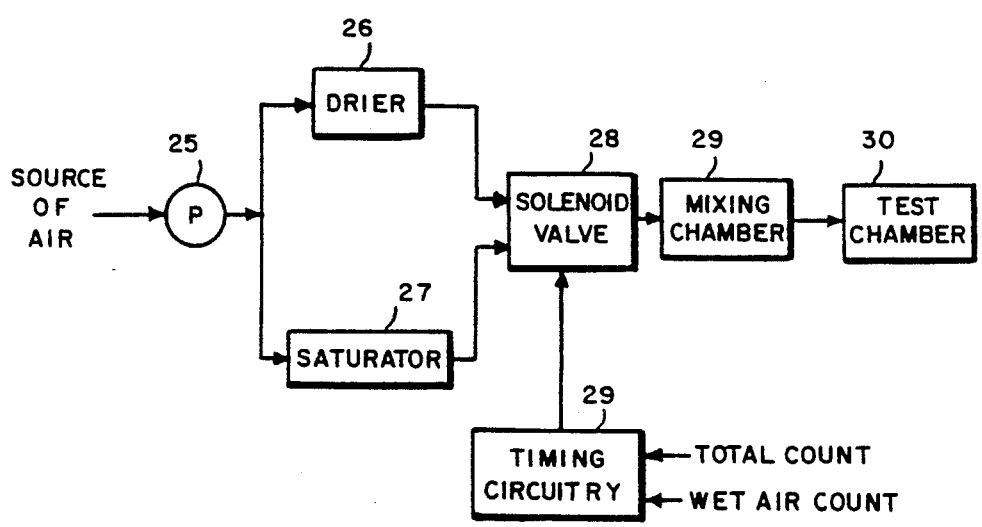
FIG. 4 shows a block diagram of an alternative embodiment of the invention.

The system of FIG. 1 can be arranged in an alternative configuration as shown in FIG. 4, for example. As seen therein an input air stream (e.g., at room temperature and humidity, for example) is simultaneously supplied via pump 25 to a drier 26 and a saturator 27 the outputs therefrom being supplied to a solenoid valve 28 which is operated so as to supply a dry output air stream when in one position and a wet air stream when in an alternative position. The solenoid valve is controlled by timing circuitry in substantially the same manner as discussed with reference to FIG. 1 wherein the wet air stream is supplied for a specified number of counts of a total count representing a complete cycle and the dry air stream is supplied for the remaining counts of total count cycle. The pulses of wet and dry air streams are supplied to a mixing chamber 29 alternately and are mixed therein and supplied as a mixed output air stream therefrom to a test chamber 30. The system is calibrated as discussed above with respect to FIG. 1 by approximately setting the total count in terms of the maximum saturation % RH achievable by the wet air stream from saturator 27 and in terms of the wet air count required to provide a desired match to a linear curve, as discussed above.

As can be seen in FIGS. 1 and 4, the saturator can either be arranged to be physically placed adjacent three sides of the test chamber (FIG. 1) or to be positioned separate from the test chamber (FIG. 4). Since the temperatures of the test chamber and of the saturator should be maintained at substantially the same temperature level, it is preferable to surround the test chamber with the saturator as shown in FIG. 1 so as to better assure that their temperatures are substantially the same. Alternatively, in some designs it may be necessary or more desirable to maintain them separately as in FIG. 4 so long as the temperatures thereof are maintained in an appropriate manner at substantially the same level.

While both FIGS. 1 and 4 depict the use of a mixing chamber for producing an output stream of mixed air at the desired % RH, which air stream is then supplied to the test chamber, in some designs it may be desirable to eliminate the use of an intermediate, separate mixing chamber and supply the output air streams from the drier and saturator in FIG. 1 or from the solenoid valve in FIG. 4 directly to a test chamber where they are appropriately mixed and dispersed throughout the test chamber to provide air therein at the desired % RH. In such case it is preferable that the test chamber be relatively large in volume so that appropriate mixing can occur in the general region of the test chamber at which the incoming air streams are supplied well before the air stream disperses throughout the test chamber.

The ability of the pulsed air streams to mix in an adequate fashion depends to some extent on the volume of the mixing or test chamber and the rate (the cyclic frequency) at which the air streams are supplied thereto, the lower the frequency the larger the volume of the chamber required to produce adequate mixing. The size of the chamber will depend on the size of the overall device desired and the cyclic frequency will depend on the characteristics of the solenoid valve used. Accordingly, such parameters can be selected by a designer as desired for the particular applications in which the device is to be used.

As a further alternative, if desired, the mixing operation in a mixing and/or test chamber can be enhanced by using a fan, or air-stirring, device within the chamber to produce a more effective mixing of the incoming pulsed air stream.

While the above configurations and the operations thereof represent preferred embodiments of the invention, other modifications thereto within the spirit and scope of the invention may occur to those in the art. Hence, the invention is not to be construed as limited to the specific embodiments disclosed, except as defined by the appended claims.

What is claimed is:

1. An apparatus for providing an air stream having a desired relative humidity to a chamber, said apparatus comprising
   a source of air at room temperature and room humidity;
   saturator means for receiving air from said source and supplying a wet air stream;
   drier means for receiving air from said source and supplying a dry air stream;
   control means for controlling a cyclical supplying of alternating, preset and substantially constant times quantities of said wet air stream and said dry air stream to said chamber for mixing so as to provide a mixed air stream therein having said desired relative humidity independently of the humidity in said chamber, said control means including
   valve means for providing the quantities of said wet and said dry air streams, wherein said valve means receives the air from said source thereof and responds to said timing means so as to supply the air from said source to said drier means and to said saturator means in accordance with a selected timed manner.

2. An apparatus in accordance with claim 1 wherein said valve means receives the air from said source thereof and responds to said timing means so as to supply the air from said source to said drier means and to said saturator means in said selected timed manner.

3. An apparatus in accordance with claim 2 wherein said chamber is a mixing chamber and further including
   a test chamber; and
   means for supplying said mixed air stream from said mixing chamber to said test chamber to use therein.

4. An apparatus in accordance with claim 2 wherein said saturator means is arranged to partially enclose said test chamber so as to maintain the temperatures of said saturator means and said test chamber at substantially the same temperature level.

5. An apparatus in accordance with claim 4 wherein the air from said source is supplied simultaneously to said saturator means and said drier means and said valve means receives wet and dry air streams from said saturator means and said drier means, respectively, and to said timing means so as to supply said wet and dry air streams to said chamber in said selected timed manner.

6. An apparatus in accordance with claim 4 wherein said chamber is a test chamber.

7. An apparatus in accordance with claim 4 wherein said source of air includes pump means for supplying air from said source substantially at room temperature and room humidity.

8. An apparatus in accordance with claims 4 or 5 wherein said valve means is a solenoid valve.

9. An apparatus in accordance with claim 4 wherein said timing means includes time counting means for cyclically supplying said selected quantities of wet and dry air streams in a manner such that each supply cycle is defined by selecting a first number of counts provided by said counting means and the supplying of wet air during each supply cycle is defined by a second number of counts provided by said counting means.

10. A method for providing an air stream having a desired relative humidity to a chamber, said method comprising the steps of providing an input air stream at room temperature and room humidity;

supplying said input air stream to a saturator to produce a wet air stream;

supplying said input air stream to a drier to produce a dry air stream;

supplying a selected quantity of said wet air stream to said chamber for a first pre-specified and substantially constant time portion of a supply time cycle;

supplying a selected quantity of said dry air stream to said chamber for a second pre-specified and substantially constant time portion of said supply time cycle;

mixing the selected quantities of said wet and dry air streams in said chamber to provide an output air stream having said desired relative humidity independently of the humidity in said chamber;

wherein said input air stream is supplied simultaneously to said drier and to said saturator and the selected quantities of said wet and dry air streams are then supplied therefrom on a cyclical basis over a plurality of time cycle for subsequent mixing thereof.

11. A method for providing an air stream having a desired relative humidity to a chamber, said method comprising the steps of providing an input air stream at room temperature and room humidity;

supplying said input air stream to a saturator to produce a wet air stream;

supplying said input air stream to a drier to produce a dry air stream;

supplying a selected quantity of said wet air stream to said chamber for a first pre-specified and substantially constant time portion of a supply time cycle;

supplying a selected quantity of said dry air stream to said chamber for a second pre-specified and substantially constant time portion of said supply time cycle;

mixing the selected quantities of said wet and dry air streams in said chamber to provide an output air stream having said desired relative humidity independently of the humidity in said chamber;

wherein said input air stream is supplied to said saturator and to said drier, respectively, at different times and the selected quantities of said wet and dry air streams are then supplied therefrom on a cyclical basis over a plurality of cycles for subsequent mixing thereof.

* * * * *